(No Model.)
J. D. SMITH.
ANCHOR FOR POSTS.
No. 431,857. Patented July 8, 1890.
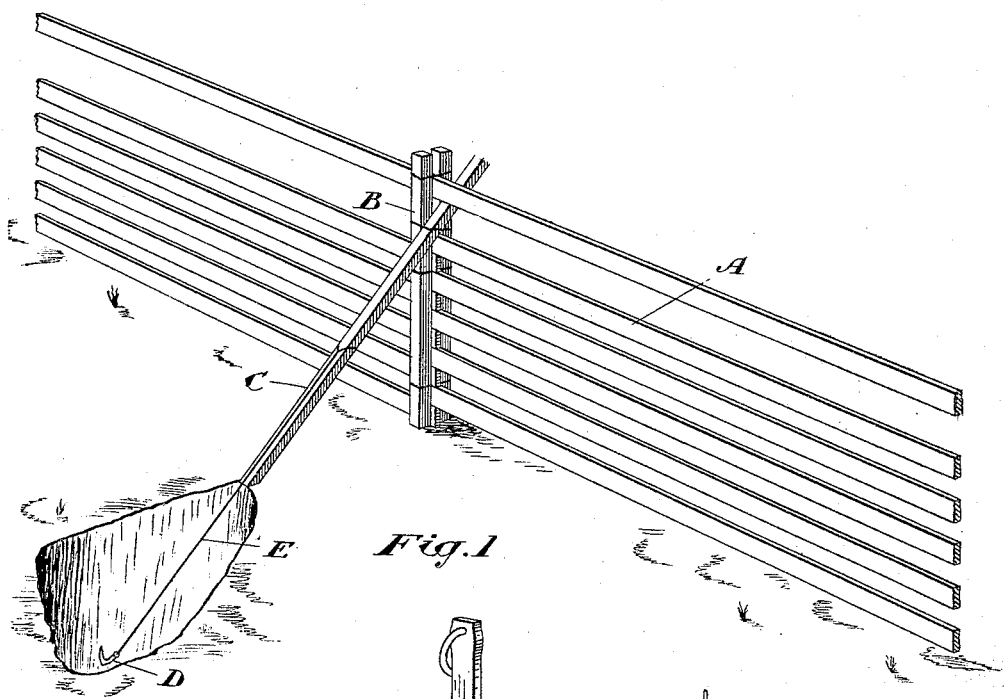
Witnesses
J. Edw. Maybee
F. Russell Cameron
Inventor
Joseph. D. Smith
by Donald C. Ridout & Co

UNITED STATES PATENT OFFICE.

JOSEPH D. SMITH, OF MOUNT ELGIN, ONTARIO, CANADA.

ANCHOR FOR POSTS.

SPECIFICATION forming part of Letters Patent No. 431,857, dated July 8, 1890.

Application filed September 30, 1889. Serial No. 325,568. (No model.)

*To all whom it may concern:*

Be it known that I, JOSEPH DAVID SMITH, of the village of Mount Elgin, in the county of Oxford, in the Province of Ontario, Canada, have invented a certain new and Improved Anchoring Device for Securing Fence and other Posts, of which the following is a specification.

My invention relates to a simple device for permanently and securely fastening in position posts which are not sunk in the ground below the frost-line; and my invention is specially designed for the purpose of providing simple means by which the class of fences commonly known as "portable fences" may be rigidly and permanently fixed in position without the possibility of being upheaved or thrown out of line by the action of frost.

My invention consists of an inverted-hook-shaped anchor driven into the ground below the frost-line by a bar designed to fit into the hook and expand or spread the same during the act of driving it, a wire being connected to the anchor and arranged so that it may be wrapped round or otherwise secured to any convenient point on the post.

Figure 1 is a perspective view showing my invention applied to a fence. Fig. 2 is an enlarged view of my improved anchoring-hook. Fig. 3 is a view of the bar by which the hook is driven into position.

All farmers who have adopted what are commonly known as "portable fences" are aware of the serious objection to this class of fence arising from the fact that the upheaval of the ground caused by frost throws this class of fence out of alignment, not only destroying its appearance, but also materially affecting its value as a fence. With the view of retaining the material advantages of this class of fence arising from the economy in its erection, and at the same time to secure the permanency of that class of fence in which the posts are sunk in the ground below the frost-line, I conceived the idea of the anchor system, which I shall now proceed to briefly describe.

I do not limit myself to the application of my anchor system to any special class of fence or to any particular kind of post; but for the purpose of this specification I have chosen a fence of my own design, in which the staying-posts are arranged all on one side of the fence, which system of staying is only practical when my anchoring system is employed.

In this system, A represents the horizontal bars forming the ordinary panels of a fence. These bars are supported by the vertical posts B, which are securely lashed or otherwise fastened to the diagonal brace C, which extends only on one side of the fence, leaving the ground close to the opposite side of the fence in a condition to be cultivated, which would be impossible to effect were diagonal braces employed on that side of the fence.

D is a hook-shaped anchor, made of any suitable material and size and connected by the wire E to the diagonal brace C. The hook D is inserted in an inverted condition in the ground, and the curved grooved end of the bar F is placed in the said hook. The other end of the said bar is then hammered upon, so as to drive the anchor D into the ground. Of course the distance that this anchor should be driven depends upon the nature of the soil; but I may say that for the permanency of the affair I prefer to drive the said anchor into the ground below the frost-line. The wire E, which is connected to the anchor, as described, is of course carried with it, and as the tapered grooved end of the bar F expands the anchor while it is being driven into the ground it forms a permanent anchor, which securely holds the wire so that any strain desired may be exerted on the wire without in any way loosening the anchor. Owing to this permanent anchorage it is only necessary to place diagonal braces C on one side of the fence, and the fence secured as described is permanently and rigidly held in position.

It will of course be understood that I do not confine myself to any particular dimensions, nor to the exact shape of the anchor exhibited, nor do I restrict myself to any particular class of wire to be used. It will also be understood by any one reading the specification that the anchor, though specially adapted for fences constructed as described, may be used in any case where it is desired to cheaply secure in a permanent position a post which is not properly embedded in the soil.

What I claim as my invention is—

5   An expansible hook or anchor adapted to be driven and secured in the ground, as described, in combination with a wire connected to said anchor and also to the post or brace of the fence, substantially as and for the purpose specified.

Toronto, August 24, 1889.

JOSEPH D. SMITH.

In presence of—
    CHARLES C. BALDWIN,
    W. G. MCMILLAN.